United States Patent [19]
Nakamura

[11] 3,946,199
[45] Mar. 23, 1976

[54] TEMPERATURE CONTROL MEANS FOR TONER FUSING DEVICE IN AN ELECTROSTATIC COPIER

[75] Inventor: Yoshihiro Nakamura, Toyokawa, Japan

[73] Assignee: Minolta Camera Kabushiki Kaisha, Osaka, Japan

[22] Filed: Sept. 23, 1974

[21] Appl. No.: 508,493

[30] Foreign Application Priority Data
Oct. 15, 1973 Japan.............................. 48-116081

[52] U.S. Cl. ................. 219/499; 219/216; 219/497
[51] Int. Cl.² .......................................... H05B 1/02
[58] Field of Search ........... 219/216, 494, 497, 499, 219/501, 504, 505

[56] References Cited
UNITED STATES PATENTS
| | | | |
|---|---|---|---|
| 3,553,429 | 1/1971 | Nelson | 219/497 |
| 3,558,853 | 1/1971 | Schluntz | 219/497 X |
| 3,699,363 | 10/1972 | Roberts | 219/499 X |

Primary Examiner—J. D. Miller
Assistant Examiner—Fred E. Bell
Attorney, Agent, or Firm—Wolder & Gross

[57] ABSTRACT

A temperature control network for a toner fusing device in an electrostatic copier, includes a temperature sensing member located within the toner fusing device generating an electric signal corresponding to the temperature within the toner fusing device to control the electric power supplied to the fusing device heating unit by way of a bridge and differential amplifier circuit to maintain the temperature in the toner fusing device constant, while the electric signal from the temperature sensing member controls other devices in the electrophotographic reproducing apparatus, when the temperature in the fusing device reaches a toner fusible temperature upon starting the operation of the electrostatic copier or when the toner fusing device is cooled to a temperature below a given temperature upon the termination of the operation of the electrostatic copier.

10 Claims, 3 Drawing Figures

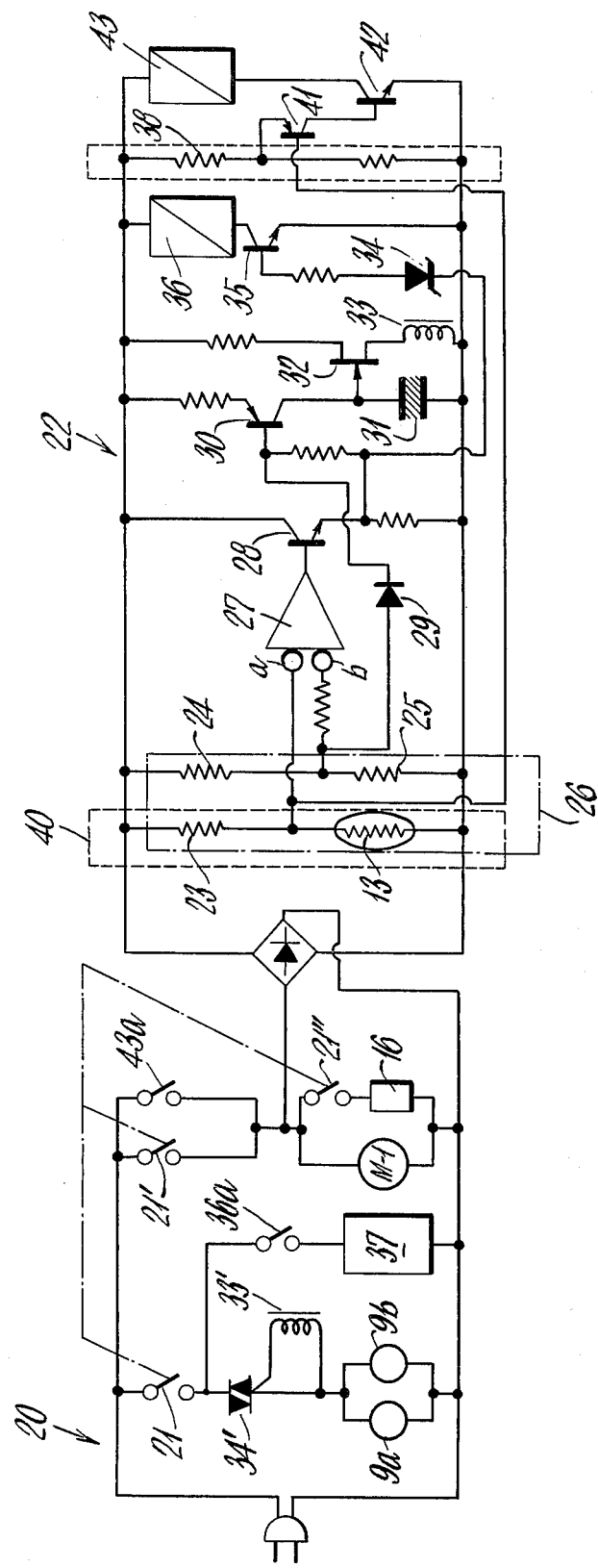

TEMPERATURE CONTROL MEANS FOR TONER FUSING DEVICE IN AN ELECTROSTATIC COPIER

BACKGROUND OF THE INVENTION

The present invention relates to a temperature control network for a toner fusing device in an electrostatic copier, which has a heating unit such as an infrared lamp and a transporting means such as a conveyor, roller and the like, and is adapted to heat and fuse a copy image made visible by means of a fusible resin toner.

In the toner fusing device, it is imperative to maintain the temperature in the toner fusing device at a given temperature, hereinafter referred to as the toner fusing temperature, in order to produce a uniform fusing of a copy image and to prevent the toner fusing device from overheating. To this end, temperature control means such as disclosed in U.S. Pat. No. 3,553,429 or U.S. Pat. No. 3,558,853 and the like, have been proposed, in which there is provided a thermistor to control the electric power to be supplied to a heating unit. However, the electrostatic copier having the aforesaid fusing device suffers from disadvantages in that the toner image remains unfused, until the toner fusing device at the start of operation reaches a toner fusible temperature, hereinafter referred to as the toner fusible temperature, so that the copying operation should be suspended during heat-up and on the termination of copying, when all functions of the copier have been stopped, thereby the heated air residing within the fusing device effects an adverse influence on the other devices in the copier, such as the photosensitive member and the like, so that such heated air should be rapidly discharged to the exterior of the copier, until the toner fusing device reaches a temperature which would not adversely effect the other devices, such temperature being hereinafter referred to as a safe rest temperature. As a result, it is desirable that the temperature control means for use in a toner fusing device in the electrostatic copier be provided with the above functions. However, since the aforesaid toner fusing temperature, toner fusible temperature and safe rest temperatures are different relative to each other, the prior art copier should use a plurality of temperature sensing members for separately detecting three temperatures to control the other devices in the copier. This leads to the use of a complicated circuit in the temperature control means in the prior art electrostatic copier, with the accompanying need to provide a plurality of temperature sensing members in the toner fusing device.

SUMMARY OF THE INVENTION

It is a principal object of the present invention to provide a temperature control network for a toner fusing device in an electrostatic copier.

It is another object of the present invention to provide a temperature control network in a toner fusing device in an electrostatic copier, which is economical and simple in construction because of the provision of a single temperature sensing member which functions for various controls.

It is a further object of this present invention to provide a temperature control network for use in a toner fusing device in an electrostatic copier, which may independently set the toner fusing temperature, toner fusible temperature and safe rest temperature.

Other objects and advantages of the present invention will become apparent from the following description of the invention.

These and other objects of the present invention may be readily attained in a temperature control network for a fusing device in an electrostatic copier, which network receives an electric signal from a temperature sensing member provided within a toner fusing device corresponding to the temperature prevailing within the toner fusing device to thereby control the electric power supplied to a heating unit located within the toner fusing device by way of bridge, differential amplifier and other circuit components, thereby regulating the temperature within the toner fusing device at a predetermined value, while the network receives an electric signal from the temperature sensor to control other devices in the electrostatic copier, when at the start of the operation of the electrostatic copier, the temperature in the toner fusing device reaches a toner fusible temperature, or when upon termination of the operation of the electrostatic copier, the temperature in the toner fusing device is lowered below the safe rest temperature. More specifically, the temperature control network features a single temperature sensing member, which senses the fusing temperature, fusible temperature and safe rest temperature to control a heating unit located within the toner fusing device, a cooling device in the toner fusing device and a main control circuit in the electrostatic copier.

BRIEF DESCRIPTION OF THE DRAWINGS

FIG. 3 is an electric circuit of a temperature control network for use in a toner fusing device in an electrostatic copier according to the present invention.

DESCRIPTION OF THE PREFERRED EMBODIMENTS

Figure 1:
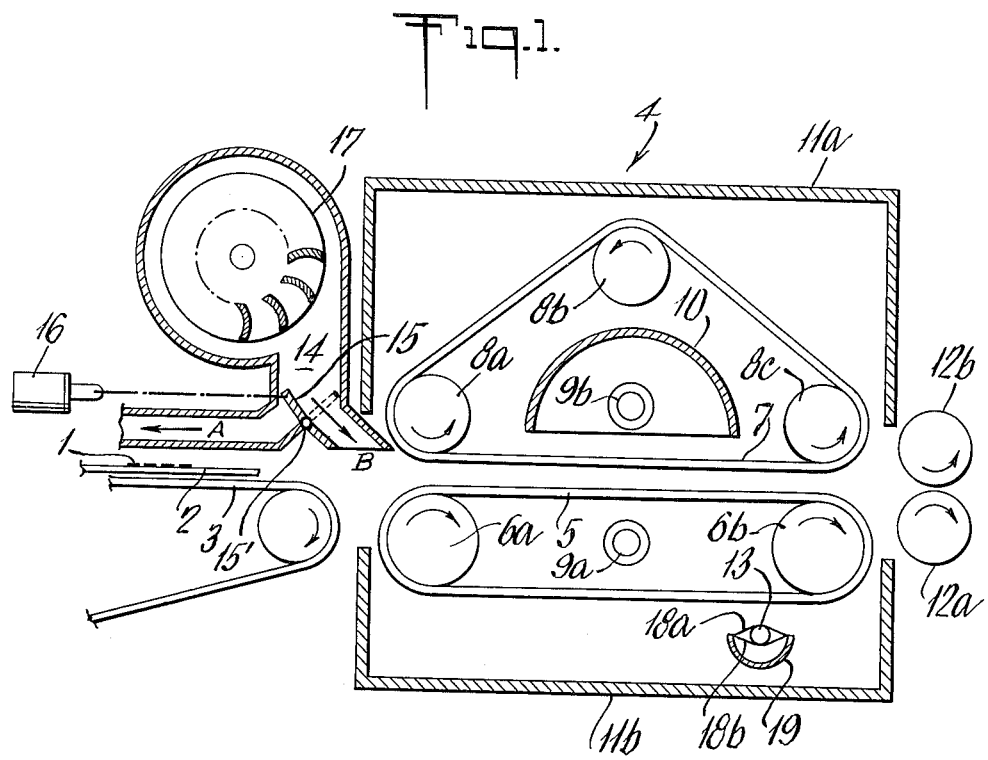
FIG. 1 is a cross-sectional view showing the essential part of a toner fusing device in an electrostatic copier using a temperature control network according to the present invention.

Referring now to the drawings, a copying paper 2 carrying a toner image 1 thereon is transported by means of a conveyor belt 3 onto a conveyor belt 5 traversing a toner fusing device 4. The conveyor belt 5 has a width larger than that of the copying paper 2 and is driven by means of rollers 6a, 6b rotating clockwise in the direction of the arrows. The conveyor belt 5 functions as a heating member for the copying paper, and is formed, for example, of a stainless steel screen or mesh, and there is provided an infrared ray lamp 9a in the space delineated by the runs of the conveyor belt 5, the energizing current to infrared ray lamp 9a being controlled by means of a temperature control mechanism to be hereinafter described. Located above the conveyor belt 5 is a heat-conductive guide belt 7 having a width corresponding to the width of the copy paper, the belt 7 being guided and driven by rollers 8a, 8b and 8c rotating counter clockwise in the direction of the arrows. Disposed in the space defined by the runs of guide belt 7 are an infrared ray lamp 9b whose energizing current is controlled as in the case with the infrared lamp 9a, and a thermo-reflecting mirror 10 whose reflecting surface faces the conveyor belt 5. The toner fusing device 4 is thermally insulated by means of heat insulating plates 11a and 1b, while the temperature in the toner fusing device may be sensed by a temperature responsive or sensor element such as a thermistor 13 which is located in the position below the conveyor belt 5 and where it undergoes the thermal influence from the infrared ray lamps 9a, 9b. The copy paper 2, whose toner image has been heated and fused by means of infrared ray lamps 9a, 9b, is transported by means of the rollers 12a, 12b to the exterior of the copier. An air shutter or gate 15 provided in an air duct 14 is swingably journalled on a shaft 15' and swung by means of a solenoid 16. The air shutter 15 is positioned in the position shown by the broken line at the operating time of the copier, i.e., when the solenoid 16 is in elecctrically conductive condition. The shutter 15 is adapted to guide air flow through the air duct 14 under the action of an air fan 17 in the direction of arrow A, thereby preventing the adverse influence on the other devices, of the heat radiated from the toner fusing device, for instance, by cooling the photosensitive member.

On the other hand, at the non-operating time of the copier, i.e., when the current flow to solenoid is interrupted, the shutter 15 is located in the position shown by the solid line in the drawing, whereby the air from the air fan 17 is directed toward the toner fusing device 4 to rapidly discharge the heated air residing in the toner fusing device 4 to the exterior of the copier, thereby cooling the toner fusing device 4. The thermistor 13 is interposed between or encompassed by metal meshes of screens 18a and 18b made of a stainless steel or brass having a small thermal capacity and good thermal conductivity, and there is provided a reflecting mirror 19, such as is formed of aluminum, which gives good thermal reflectability and is located on the opposite side of the conveyor belt 5 with respect to the thermistor 13.

Figure 2:
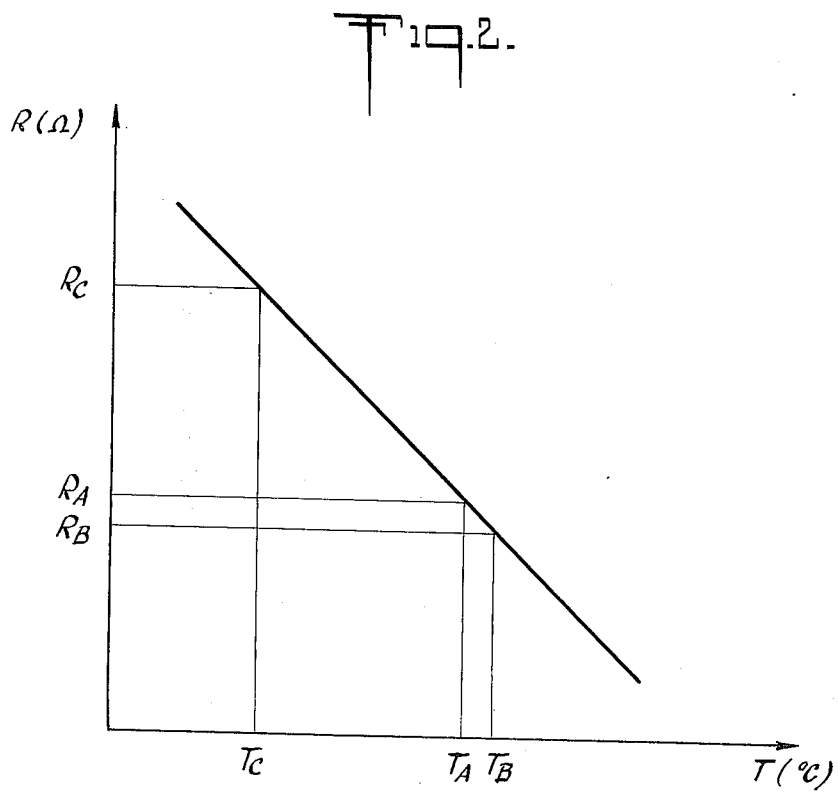
FIG. 2 is a graph showing the characteristics of a thermistor.

FIG. 2 is a graph illustrating the characteristic of a typical thermistor in the detection of temperature. TA represents a toner fusible temperature in a toner fusing device, TB represents the toner fusing temperature and TC represents the safe rest temperature, with resistances RA, RB and RC of the thermistor for the respective temperature TA, TB and TC being represented by RA, RB and RC respectively.

An electric network for the temperature control in a toner fusing device in an electrostatic copier, according to the present invention, is shown in FIG. 3, in which, when the mainswitch in the electrostatic copier, i.e., an electric power source switch 21 is closed, then the contacts 21', 21'' will be closed in association therewith, so that electric current flows through the infrared ray lamps 9a, 9b to thereby heat the toner fusing device 4, while the electric current will flow through the motor M-1 for driving the air fan 17, and solenoid 16 to thereby locate the air shutter in the position shown by broken line in FIG. 1 in a manner that air from the fan 17 will be guided in the direction of arrow A shown in FIG. 1, thus preventing the adverse effect on the other devices, of the heat radiated from the toner fusing device. At the same time, voltage is applied to the temperature control circuit, the D.C. energized circuit 22. A bridge 26 consisting of the thermistor 13 and resistors 23, 24 and 25 in the respective legs of the bridge circuit is so designed that a temperature in the toner fusing device is balanced at a temperature slightly higher than TA. Thus, when the temperature in the toner fusing device 4 is lower than TA, i.e., when the resistance of the thermistor 13 is higher than RA, the bridge is unbalanced, so that the voltage at the inverted input $a$ of a differential amplifier 27 is higher than the voltage of the non-inverted input $b$, thereof, and the output of the differential amplifier 27 is substantially at the same potential with the minus line. On the other hand, the base of a transistor 30 is connected by way of a diode 29 to the junction of resistors 24 and 25, so that the base voltage of the transistor 30 is at the same level with the partial voltage between the resistor 24 and resistor 25. This voltage is converted by means of transistor 30 into electric current to thereby charge a condensor 31. When the voltage across the condensor 31 exceeds the peak or trigger voltage (which is lower than the partial voltage of the resistor 24 and the resistor 25) of the uni-junction transistor (U.J.T.) 32, then the condensor 31 is discharged by way of a pulse transformer 33. In this respect, there will be produced a pulse on the secondary side 33' of the pulse transformer to control a current flowing through a triac 34', thereby controlling the phase angle of the current fed to the infrared ray lamps 9a, 9b.

In other words, when the resistance of the thermistor 13 is higher than RB, the collector current in the transistor 30 is high and a controlling phase angle will be small, so that A.C. voltage of 100% that of the electric power source voltage will be impressed on the infrared ray lamps 9a, 9b, simultaneously with the actuation of an electric power source switch 21. When the temperature in the toner fusing device 4 is increased, then the resistance of thermistor 13 will approach RB, so that the bridge 26 will reach equilibrium. At this time, the emitter voltage of the transistor 28 is at the same potential as that of the divided voltage of resistor 25 and resistor 26, as well as with the potential of the base voltage of transistor 30, and the phase control of the triac will be such that a voltage of substantially 100% of the electric power source voltage is impressed on the infrared ray lamps, as in the case where the temperature in the toner fusing device is lower than the toner fusing temperature TB. When the temperature in the toner fusing device 4 is further increased, then the resistance of the thermistor 13 is further decreased, so that the equilibrium of the bridge is overcome. As a result, the emitter potential of transistor 28 is higher than the voltage between the terminals of resistor 25, and the collector current of the transistor 30 is gradually decreased. For this reason, the oscillating frequency of UJT 32 is decreased, and the control phase angle of the triac is increased. When the temperature is further increased to exceed the toner fusing temperature TB, then the resistance of the thermistor 13 is further decreased, the output of the differential amplifier 27 is increased, and the emitter voltage of the transistor 28 is approximately equal to the electric power source voltage. In this case, the collector current of the transistor 30 is almost zero, and the oscillating frequency of UJT 32 is very much less than the frequency of the A.C. electric power source, and the electric power to be supplied to the infrared ray lamps 9a, 9b according to the phase control of the triac 34' becomes zero. The provision of the electric power control circuit to the infrared ray lamps 9a, 9b and the maintenance of the temperature in the toner fusing device 4 at the toner fusing temperature TB causes the toner fusing device 4 to effect the uniform fusing of a copy image and to prevent it from being overheated.

If the temperature in the toner fusing device is the toner fusible temperature TA in the course of the rise of temperature in the toner fusing device in the aforesaid manner, then the emitter voltage of the transistor 28 is increased over the Zener voltage of a Zener diode 34, whereby the base current of transistor 35 flows by way of a resistor to thereby actuate the relay 36. When the relay 36 is actuated, and the relay contact 36a is thus closed and then the main control circuit 37 in the copier will be brought into an electrically conductive condition, so that the copier is enabled and is in a copy producing condition. This eliminates the possibility of the copy image failing to be fused at the time of a copying operation.

Turning now to the off-condition of the electric power source switch 21 of the copier after the completion of the copying operation, the electric current to the infrared ray lamps 9a, 9b as well as to the main control circuit 37 are interrupted at the same time. However, since the temperature in the toner fusing device 4 is left in a high temperature condition as compared with the safe rest temperature TC, the resistance of thermistor 13 remains lower than the resistance RC. At this time, a bridge 40 consisting of resistors 23, 38, 39 and thermistor 13 so as to be equalized when the resistance of thermistor 13 is RC, is maintained in a non-equilibrium condition. In addition, since the base potential of the transistor 41 is lower than the emitter potential, the collector current of transistor 41 flows as a base current of the transistor 42, so that the relay 43 is maintained in an electrically excited condition. As a result, the contact 43a of the relay 43 is kept closed so as to maintain the air fan 17 and drive motor M-1 in an electrically energized condition, as well as the circuit 22. At this time, however, the contact 21″ has been in its open condition simultaneously with the electric power switch 21 being turned off, so that the electric current to the solenoid 16 is interrupted. As a result, the air shutter 15 as shown in FIG. 1 is transferred to the position shown by the solid line, whereby the air from fan 17 is directed in the direction of arrow B, i.e., into the interior of the toner fusing device 4, whereupon the heated air residing in the toner fusing device 4 is discharged out of the copier. This prevents any adverse influence on the other devices, of the heated air from the toner fusing device 4 in the copier. When the temperature in the toner fusing device 4 is lowered below the safe rest temperature TC, then voltage across the base emitter of the transistor 41 is inversely biased, and the collector current does not flow, so that the transistor 42 is turned off, with the accompanying interruption of electric current flowing to the relay 43. As a result, contact 43a returns to its open position, and the electric current to the motor M-1 as well as circuit 22 is interrupted, so that all functions of the copier are stopped.

The toner fusible temperature TB may be arbitrarily set by varying the resistances of resistor 24 or 25, at least one of which may be adjustable, the toner fusing temperature TA may be set by varying the amplification gain of the differential amplifier 27, and the safe rest temperature TC may be set by varying the resistance of the resistor 38 or resistor 39, at least one of which may be adjustable.

As is apparent from the foregoing description, the temperature control network according to the present invention controls the cooling device in the toner fusing device as well as the main control circuit of the copier by means of a single thermistor, so that circuits may be simplified and only a single thermistor is required within the toner fusing device, thus presenting considerable economy.

While there have been described and illustrated preferred embodiments of the present invention, it is apparent that numerous alterations, omissions and additions may be made without departing from the spirit thereof.

I claim:

1. A temperature control network for a toner fusing device having an electrical heater in an electrostatic copier including copying motivating means, comprising:
   a temperature sensing member responsive to the temperature prevailing within the toner fusing device,
   a toner fusing device temperature regulating circuit including a temperature control bridge having therein said temperature sensing member and a resistor for setting a toner fusing temperature and controlling the current supplied to the heater in the toner fusing device for regulating the temperature in the toner fusing device at a first predetermined level in response to said temperature sensing member,
   and another circuit for sensing a toner fusible temperature including a differential amplifier having an input connected to said temperature control bridge, and means responsive to the output of said amplifier for disabling said copying motivating means until said fusing device temperature reaches a second predetermined level as detected by said temperature sensing member,
   thereby, sensing two different temperatures through the medium of one temperature sensing member, and as the result maintaining the temperature in the toner fusing device substantially constant and causing the copying operation of the copier operable upon starting of the operation of the copier.

2. A temperature control network according to claim 1 wherein said disabling means includes a relay which has a switch connected in series with an electric circuit for controlling an operation of the copying motivating means and is actuated in response to an electric signal from the differential amplifier, thereby rendering the electrostatic copier operable as said circuit senses the toner fusible temperature.

3. A temperature control network for a toner fusing device having an electrical heater and including a cooling means in an electrostatic copier comprising:
   a temperature sensing member responsive to the temperature prevailing within the toner fusing device,
   a toner fusing device temperature regulating circuit including a temperature control bridge having therein said temperature sensing member and a resistor for setting a toner fusing temperature and controlling the electric current supplied to the heater in the toner fusing device for regulating the temperature in the toner fusing device at a first predetermined level in response to said temperature sensing member,
   a second circuit for sensing a third predetermined fuser temperature including a bridge having said temperature sensing member and a resistor for setting said third predetermined temperature, and means responsive to said second circuit for disabling said cooling means upon the temperature in the toner fusing device falling below said third predetermined fuser temperature after said heater is deenergized on the termination of copying, thereby, sensing two different temperatures through the medium of one temperature sensing member, and as the result maintaining the temperature in the toner fusing device substantially constant and causing the cooling means non-operable on the terminationn of copying.

4. A temperature control means according to claim 3 wherein said disabling means further includes a relay which has a switch connected in series with an electric circuit controlling the operation of the cooling means, and is actuated by an electric signal generated by the bridge, thereby disabling the cooling means in response to said temperature sensing member sensing said third predetermined temperature.

5. A temperature control network for a toner fusing device having an electrical heater in an electrostatic copier including copying motivating means and cooling means comprising:
a temperature sensing member responsive to the temperature prevailing within the toner fusing device,
a toner fusing device temperature regulating first circuit including a temperature control bridge having therein said temperature sensing member and a resistor for setting a toner fusing temperature, and controlling the electric current supplied to the heater in the toner fusing device for regulating the temperature in the toner fusing device at a first predetermined level in response to said temperature sensing member,
a second electric circuit for sensing a toner fusible temperature including a differential amplifier having an input connected to said temperature control bridge, means responsive to the output of said amplifier for disabling said copy motivating means until said fusing device temperature reaches a second predetermined level as detected by said temperature sensing member, and
a third circuit for sensing a third predetermined fuser temperature including a bridge having said temperature sensing member and a resistor for setting said third predetermined temperature, and means responsive to said third circuit for disabling said cooling means upon the temperature in the toner fusing device falling below said third predetermined temperature after said heater is deenergized on the termination of copying,
thereby, sensing three different temperatures through the medium of one temperature sensing member, and as the result maintaining the temperature in the toner fusing device substantially constant, causing the copying operation of the copier operable upon starting of the operation of the copier and causing the cooling means non-operable on the termination of copying.

6. A temperature control network according to claim 5 wherein said copying motivating disabling means includes a relay which has a switch connected in series with an electric circuit for controlling an operation of the copying motivating means and is actuated in response to an electric signal from the differential amplifier, and said cooling means disabling means further includes a relay which has a switch connected in series with an electric circuit controlling the operation of the cooling means and is actuated by an electric signal generated by the bridge.

7. A temperature control means according to claim 5 wherein said first circuit further includes a triac which is connected in series with the heater in the toner fusing device and controls the phase angle of alternating current applied to the heater in accordance with the electric signal from said temperature sensing member, thereby controlling an electric power to be supplied to the heater for maintaining the temperature in the toner fusing device substantially constant.

8. In a xerographic copying machine, means for effecting a copying operation, a toner fuser including an electrical heater, a temperature sensor disposed to respond to the temperature of said toner fuser, means including a first circuit responsive to said temperature sensor for controlling the current to said heater to regulate the temperature of said toner fuser at a first predetermined value and means including a second circuit responsive to said temperature sensor to disable said means for effecting a copying operation in response to said sensor sensed toner fuser temperature being below a second predetermined value.

9. The xerographic copying machine of claim 8 comprising a motor driven blower means for connecting said blower motor to a source of current and means including a third circuit responsive to said temperature sensor for opening said connecting means to deenergize said blower motor in response to the temperature sensed by said sensor falling below a third predetermined value.

10. The copying machine of claim 8 including means for independently adjusing said first and second predetermined temperature values.

* * * * *